US012621702B2

(12) United States Patent
Joseph et al.

(10) Patent No.: US 12,621,702 B2
(45) Date of Patent: *May 5, 2026

(54) CONFIGURATION, ACTIVATION AND DEACTIVATION OF PACKET DUPLICATION

(71) Applicant: QUALCOMM Incorporated, San Diego, CA (US)

(72) Inventors: Vinay Joseph, Calicut (IN); Luis Fernando Brisson Lopes, Swindon (GB); Gavin Bernard Horn, La Jolla, CA (US); Peerapol Tinnakornsrisuphap, San Diego, CA (US); Yu-Ting Yu, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/646,087

(22) Filed: Dec. 27, 2021

(65) Prior Publication Data

US 2022/0124545 A1      Apr. 21, 2022

Related U.S. Application Data

(63) Continuation of application No. 16/273,827, filed on Feb. 12, 2019, now Pat. No. 11,212,695.
(Continued)

(51) Int. Cl.
*H04W 28/02*        (2009.01)
*H04L 1/08*        (2006.01)
(Continued)

(52) U.S. Cl.
CPC .......... *H04W 28/0236* (2013.01); *H04L 1/08* (2013.01); *H04W 24/10* (2013.01);
(Continued)

(58) Field of Classification Search
CPC ........... H04W 28/0236; H04W 72/085; H04W 24/10; H04W 76/15; H04W 28/0215; H04W 28/065; H04W 80/08
See application file for complete search history.

(56) References Cited

U.S. PATENT DOCUMENTS 10,798,732 B2    10/2020   Park et al.
10,972,938 B2     4/2021   Mok et al.
(Continued)

FOREIGN PATENT DOCUMENTS

WO        2015020507 A1    2/2015
WO        2016053885 A1    4/2016

OTHER PUBLICATIONS

European Search Report—EP22180497—Search Authority—The Hague—Sep. 23, 2022.
(Continued)

*Primary Examiner* — Parth Patel

(57) ABSTRACT

Certain aspects of the present disclosure provide techniques for determining a configuration for packet data convergence protocol (PDCP) duplication. Certain aspects provide a method for wireless communication. The method generally includes determining a PDCP duplication configuration corresponding to at least one of multi-connectivity (MC) or carrier-aggregation (CA) for communication of at least one bearer with a user-equipment (UE), wherein the determination is based on an indication corresponding to a link quality for the communication, and sending an indication of the determined configuration for the communication of the at least one bearer.

16 Claims, 11 Drawing Sheets

Related U.S. Application Data

(60) Provisional application No. 62/631,052, filed on Feb. 15, 2018.

(51) Int. Cl.

| | |
|---|---|
| *H04W 24/10* | (2009.01) |
| *H04W 28/06* | (2009.01) |
| *H04W 72/542* | (2023.01) |
| *H04W 76/15* | (2018.01) |
| *H04W 80/08* | (2009.01) |

(52) U.S. Cl.
CPC ..... *H04W 28/0215* (2013.01); *H04W 28/065* (2013.01); *H04W 72/542* (2023.01); *H04W 80/08* (2013.01); *H04W 76/15* (2018.02)

(56) References Cited

U.S. PATENT DOCUMENTS

| | | | | |
|---|---|---|---|---|
| 11,212,695 | B2 * | 12/2021 | Joseph | H04W 28/065 |
| 11,997,548 | B2 * | 5/2024 | Shah | H04W 36/00695 |
| 2007/0213060 | A1 | 9/2007 | Shaheen | |
| 2010/0029280 | A1 | 2/2010 | Tenny et al. | |
| 2010/0136987 | A1 | 6/2010 | Kim et al. | |
| 2010/0329270 | A1 * | 12/2010 | Asati | H04L 45/02 |
| | | | | 370/401 |
| 2012/0307685 | A1 * | 12/2012 | Kim | H04W 48/16 |
| | | | | 370/255 |
| 2012/0320822 | A1 * | 12/2012 | Tamura | H04W 88/06 |
| | | | | 370/315 |
| 2013/0136033 | A1 * | 5/2013 | Patil | H04W 84/18 |
| | | | | 370/254 |
| 2014/0056243 | A1 | 2/2014 | Pelletier et al. | |
| 2015/0358915 | A1 | 12/2015 | Semaan et al. | |
| 2016/0057800 | A1 | 2/2016 | Ingale et al. | |
| 2016/0066222 | A1 | 3/2016 | Makinen et al. | |
| 2016/0100447 | A1 | 4/2016 | Chen et al. | |
| 2016/0164793 | A1 * | 6/2016 | Basu Mallick | H04W 28/0908 |
| | | | | 370/235 |
| 2016/0191259 | A1 * | 6/2016 | Ben-Yehezkel | H04W 72/005 |
| | | | | 370/312 |
| 2016/0302079 | A1 * | 10/2016 | Chari | H04W 24/08 |
| 2017/0238239 | A1 * | 8/2017 | Ong | H04W 48/18 |
| | | | | 370/338 |
| 2017/0331670 | A1 | 11/2017 | Parkvall et al. | |
| 2017/0332371 | A1 | 11/2017 | Kubota et al. | |
| 2018/0091382 | A1 * | 3/2018 | Dronadula | H04L 43/04 |
| 2018/0213580 | A1 * | 7/2018 | Taskin | H04W 88/16 |
| 2018/0279168 | A1 | 9/2018 | Jheng et al. | |
| 2018/0279169 | A1 | 9/2018 | Wang et al. | |
| 2018/0279182 | A1 | 9/2018 | Sang et al. | |
| 2018/0279262 | A1 | 9/2018 | Babaei et al. | |
| 2018/0288684 | A1 * | 10/2018 | Ravuri | H04W 48/16 |
| 2018/0310202 | A1 | 10/2018 | Lohr et al. | |
| 2018/0324642 | A1 | 11/2018 | Yu et al. | |
| 2018/0332501 | A1 | 11/2018 | Tseng et al. | |
| 2018/0352482 | A1 * | 12/2018 | Gage | H04W 36/0011 |
| 2018/0367288 | A1 | 12/2018 | Vrzic et al. | |
| 2018/0368107 | A1 | 12/2018 | Babaei et al. | |
| 2018/0368132 | A1 | 12/2018 | Babaei et al. | |
| 2018/0368196 | A1 * | 12/2018 | Gage | H04L 63/0428 |
| 2018/0375846 | A1 * | 12/2018 | Heydon | H04W 12/106 |
| 2018/0376380 | A1 * | 12/2018 | Leroux | H04W 4/70 |
| 2018/0376457 | A1 | 12/2018 | Tseng et al. | |
| 2019/0059039 | A1 | 2/2019 | Centonza et al. | |
| 2019/0069333 | A1 | 2/2019 | Kim | |
| 2019/0098529 | A1 | 3/2019 | Park et al. | |
| 2019/0098533 | A1 | 3/2019 | Babaei et al. | |
| 2019/0098606 | A1 | 3/2019 | Sharma et al. | |
| 2019/0098640 | A1 | 3/2019 | Holakouei et al. | |
| 2019/0098682 | A1 * | 3/2019 | Park | H04L 1/08 |
| 2019/0104422 | A1 * | 4/2019 | Chiang | H04W 48/08 |
| 2019/0104562 | A1 | 4/2019 | Tsai et al. | |
| 2019/0174353 | A1 | 6/2019 | Yilmaz et al. | |
| 2019/0174391 | A1 | 6/2019 | Ode et al. | |

| | | | | |
|---|---|---|---|---|
| 2019/0182689 | A1 | 6/2019 | Martin et al. | |
| 2019/0200251 | A1 | 6/2019 | Shi et al. | |
| 2019/0200273 | A1 * | 6/2019 | Pedersen | H04L 1/1835 |
| 2019/0215717 | A1 | 7/2019 | Lee et al. | |
| 2019/0215719 | A1 | 7/2019 | Wei et al. | |
| 2019/0215725 | A1 | 7/2019 | Kim et al. | |
| 2019/0215726 | A1 | 7/2019 | Park et al. | |
| 2019/0222291 | A1 | 7/2019 | Wang et al. | |
| 2019/0253915 | A1 * | 8/2019 | Joseph | H04W 80/08 |
| 2019/0253926 | A1 | 8/2019 | Kim et al. | |
| 2019/0254100 | A1 | 8/2019 | Yu et al. | |
| 2019/0254117 | A1 | 8/2019 | Chen et al. | |
| 2019/0268799 | A1 | 8/2019 | Hong et al. | |
| 2019/0297634 | A1 | 9/2019 | Dai et al. | |
| 2019/0327143 | A1 * | 10/2019 | Kim | H04L 41/0816 |
| 2019/0335366 | A1 | 10/2019 | Jin et al. | |
| 2019/0387440 | A1 | 12/2019 | Yiu et al. | |
| 2020/0022106 | A1 | 1/2020 | Kim et al. | |
| 2020/0029379 | A1 | 1/2020 | Xiao et al. | |
| 2020/0029390 | A1 | 1/2020 | Han et al. | |
| 2020/0053826 | A1 | 2/2020 | Shi | |
| 2020/0068437 | A1 | 2/2020 | Lohr et al. | |
| 2020/0084682 | A1 * | 3/2020 | Wang | H04W 36/00835 |
| 2020/0107342 | A1 * | 4/2020 | Kuang | H04W 28/065 |
| 2020/0112879 | A1 * | 4/2020 | Shimoda | H04L 1/08 |
| 2020/0119864 | A1 | 4/2020 | Xu et al. | |
| 2020/0127896 | A1 * | 4/2020 | Davito | H04L 41/0876 |
| 2020/0154498 | A1 | 5/2020 | Wang et al. | |
| 2020/0162211 | A1 * | 5/2020 | Wang | H04L 5/0091 |
| 2020/0163140 | A1 | 5/2020 | Mochizuki et al. | |
| 2020/0178326 | A1 | 6/2020 | Sirotkin et al. | |
| 2020/0178332 | A1 * | 6/2020 | Sharma | H04W 76/15 |
| 2020/0187282 | A1 | 6/2020 | Yu et al. | |
| 2020/0267793 | A1 | 8/2020 | Sharma et al. | |
| 2020/0359356 | A1 | 11/2020 | Sirotkin et al. | |
| 2020/0374964 | A1 * | 11/2020 | Wang | H04L 5/00 |
| 2020/0382240 | A1 * | 12/2020 | Centonza | H04W 76/12 |
| 2021/0153218 | A1 * | 5/2021 | Wang | H04W 72/543 |
| 2021/0227606 | A1 * | 7/2021 | Liu | H04L 1/08 |
| 2022/0124545 | A1 * | 4/2022 | Joseph | H04W 24/10 |

OTHER PUBLICATIONS

CATT: "Discussion on Activation of PDCP Duplication", 3GPP Draft, R3-180807, 3rd Generation Partnership Project (3GPP), Mobile Competence Centre , 650, Route Des Lucioles , F-06921 Sophia-Antipolis Cedex, France, vol. RAN WG3, No. Athens, Greece, Feb. 26, 2018-Mar. 2, 2018, Feb. 13, 2018 (Feb. 13, 2018), XP051401178, 5 Pages, Retrieved from the Internet: URL:http://www.3gpp.org/ftp/tsg%5Fran/WG3%5Flu/TSGR3%5F99/Docs/ [retrieved on Feb. 13, 2018], 2.1 Activation of DL PDCP Duplication.

International Preliminary Report on Patentability—PCT/US2019/017857, The International Bureau of WIPO—Geneva, Switzerland, Aug. 27, 2020.

International Search Report and Written Opinion—PCT/US2019/017857—ISA/EPO—Apr. 29, 2019.

Samsung et al., "TP for NSA BL CR on PDCP Duplication Activation And Deactivation Over F1", 3GPP Draft, R3-180999_PDCPDUPACTDEACT V0.1, 3rd Generation Partnership Project (3GPP), Mobile Competence Centre , 650, Route Des Lucioles , F-06921 Sophia-Antipolis Cedex, France, vol. RAN WG3, No. Athens, Greece, Mar. 2, 2018, Feb. 14, 2018 (Feb. 14, 2018), XP051401296, 4 Pages, Retrieved from the Internet: URL:http://www.3gpp.org/ftp/tsg%5Fran/WG3%5Flu/TSGR3%5F99/Docs/ [retrieved on Feb. 14, 2018], 2. Discussion.

VIVO: "Ue Behavior Upon SCell-Failure of PDCP Duplication", 3GPP Draft, R2-1802081 Signaling Procedure of SCell-Failure Report, 3rd Generation Partnership Project (3GPP), Mobile Competence Centre , 650, Route Des Lucioles , F-06921 Sophia-Antipolis Cedex , France, vol. RAN WG2, No. Athens, Greece, Feb. 26, 2018-Mar. 2, 2018, Feb. 14, 2018 (Feb. 14, 2018), XP051399086, 5 Pages, Retrieved from the Internet: URL:http://www.3gpp.org/ftp/tsg%5Fran/WG2%5FRL2/TSGR2%5F101/Docs/ [retrieved on Feb. 14, 2018], 2. Discussion.

(56) References Cited

OTHER PUBLICATIONS

ZTE: "Consideration on Fast Duplication Activation and Deactivation Over F1", 3GPP Draft, R3-180135 Consideration on Fast Duplication Activation and Deactivation Over F1, 3rd Generation Partnership Project (3GPP), Mobile Competence Centre , 650, Route Des Lucioles , vol. RAN WG3, No. Sophia Antipolis, France, Jan. 22, 2018-Jan. 26, 2018, Jan. 12, 2018 (Jan. 12, 2018), XP051387176, 6 Pages, Retrieved from the Internet:URL:http://www.3gpp.org/ftp/tsg%5Fran/WG3%5Flu/TSGR3%5FAHGs/R3%2DAH%2D1801/Docs/ [retrieved on Jan. 12, 2018], p. 2, Proposal 1.

\* cited by examiner

600

PDCCH
DL Data
Common UL Burst 602
604
606

700

PDCCH
UL Data
Common UL Burst 702
704
706

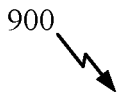
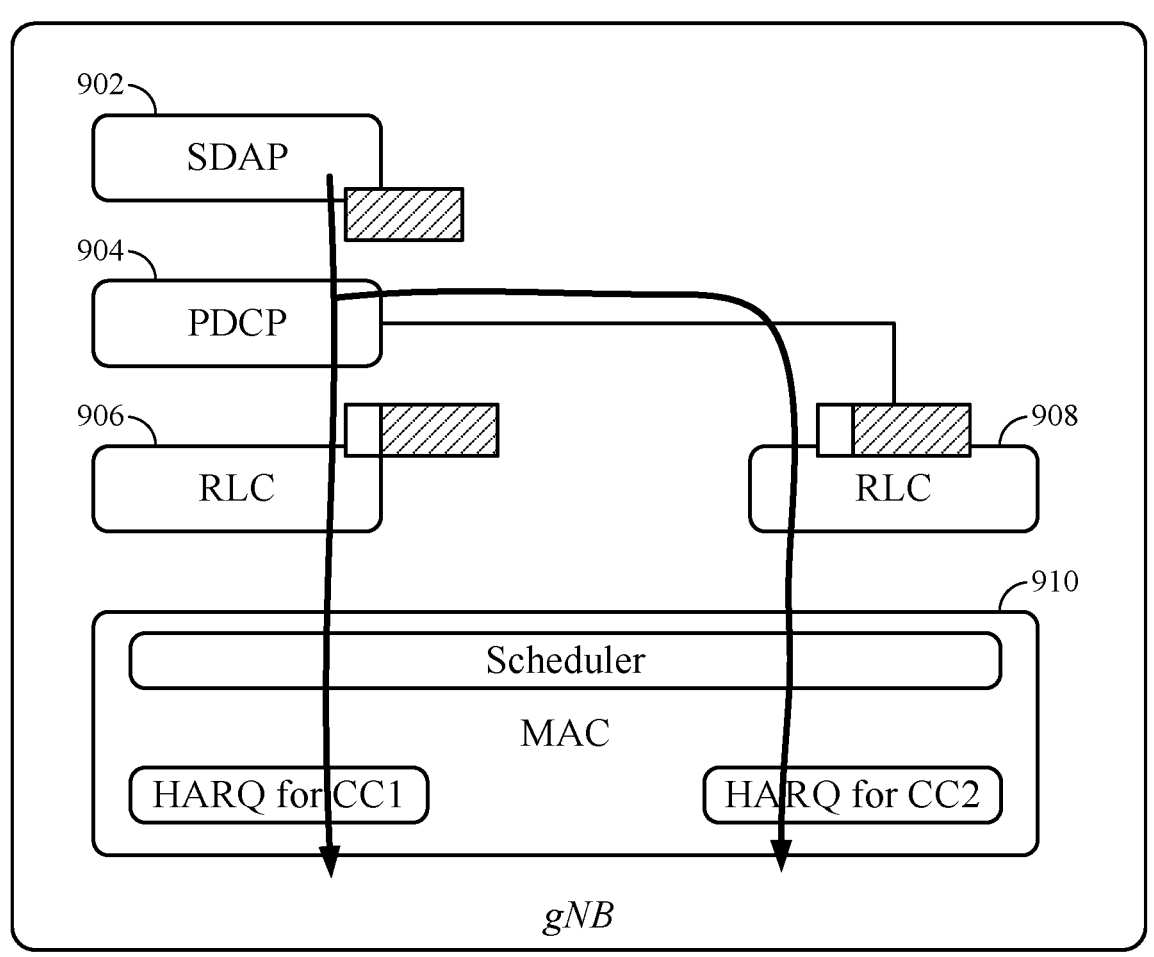
PDCP duplication with CA
FIG. 9

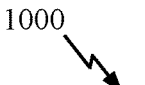
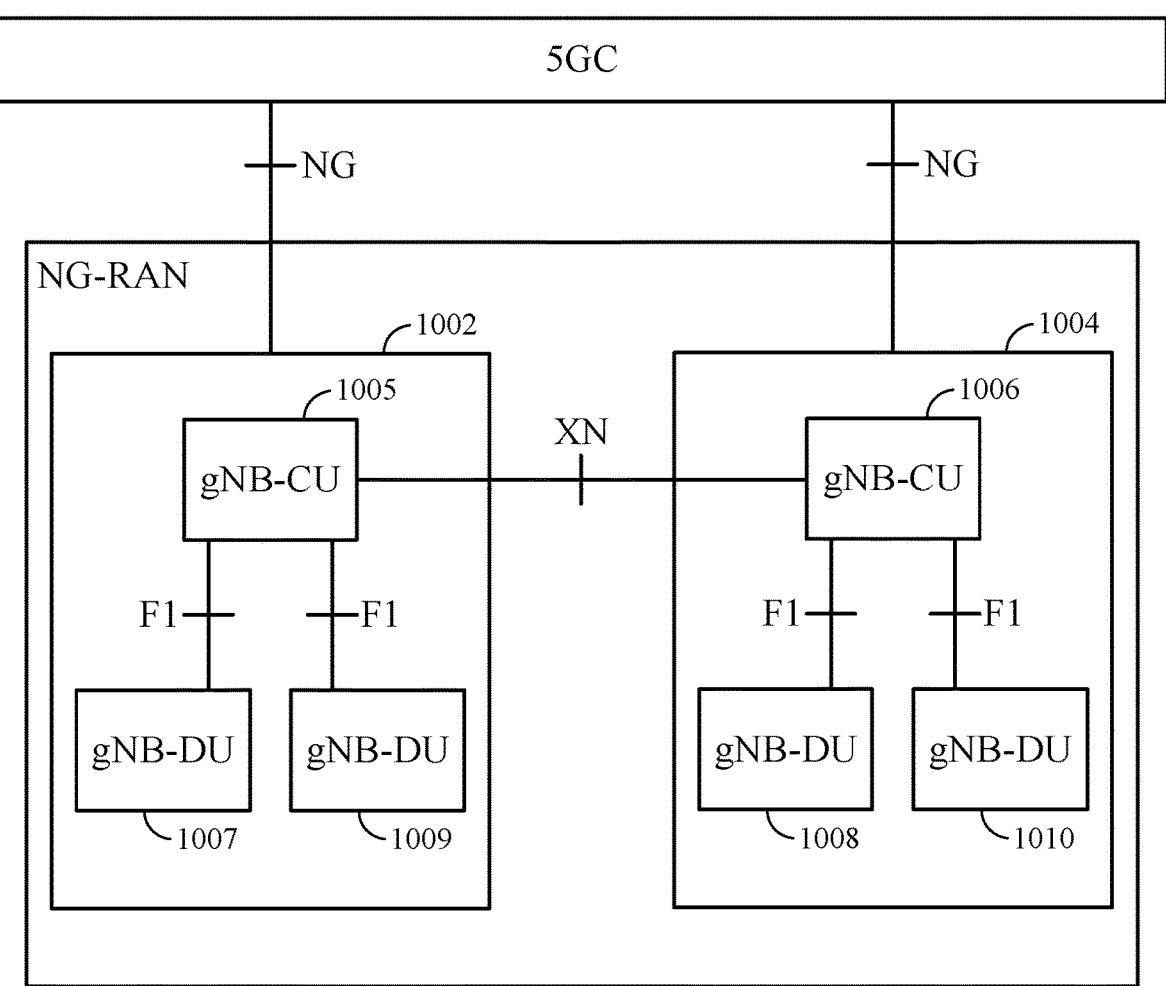
FIG. 10

1100

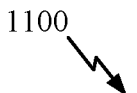

1102

DETERMINE A PACKET DATA CONVERGENCE PROTOCOL (PDCP) DUPLICATION CONFIGURATION CORRESPONDING TO AT LEAST ONE OF MULTI-CONNECTIVITY (MC) OR CARRIER-AGGREGATION (CA) FOR COMMUNICATION OF AT LEAST ONE BEARER WITH A USER-EQUIPMENT (UE), WHEREIN THE DETERMINATION IS BASED ON AN INDICATION CORRESPONDING TO A LINK QUALITY FOR THE COMMUNICATION

1104

SEND AN INDICATION OF THE DETERMINED CONFIGURATION FOR THE COMMUNICATION OF THE AT LEAST ONE BEARER

FIG. 11

CONFIGURATION, ACTIVATION AND DEACTIVATION OF PACKET DUPLICATION

CROSS-REFERENCE TO RELATED APPLICATIONS

This application is a continuation of U.S. application Ser. No. 16/273,827, filed Feb. 12, 2019, which claims benefit of U.S. Provisional Patent Application Ser. No. 62/631,052, filed Feb. 15, 2018, which are both expressly incorporated herein by reference in their entireties.

BACKGROUND

Field of the Disclosure

Aspects of the present disclosure relate generally to wireless communications systems, and more particularly, to packet duplication.

Description of Related Art

Wireless communication systems are widely deployed to provide various telecommunication services such as telephony, video, data, messaging, broadcasts, etc. These systems may employ multiple-access technologies capable of supporting communication with multiple users by sharing available system resources (e.g., bandwidth and transmit power). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

In some examples, a wireless multiple-access communication system may include a number of base stations (BSs) that each can simultaneously support communication for multiple communication devices, otherwise known as user equipment (UEs). In LTE or LTE-A network, a set of one or more BSs may define an e NodeB (eNB). In other examples (e.g., in a next generation, new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a NR BS, a NR NB, a network node, a 5G NB, a next generation NB (gNB), etc.). A BS or DU may communicate with a set of UEs on downlink channels (e.g., for transmissions from a base station or to a UE) and uplink channels (e.g., for transmissions from a UE to a BS or DU).

These multiple access technologies have been adopted in various telecommunication standards to provide a common protocol that enables different wireless devices to communicate on a municipal, national, regional, and even global level. NR (e.g., 5G radio access) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects of the present disclosure provide techniques for determining a configuration for packet data convergence protocol (PDCP) duplication.

Certain aspects provide a method for wireless communication. The method generally includes determining a PDCP duplication configuration corresponding to at least one of multi-connectivity (MC) or carrier-aggregation (CA) for communication of at least one bearer with a user-equipment (UE), wherein the determination is based on an indication corresponding to a link quality for the communication, and sending an indication of the determined configuration for the communication of the at least one bearer.

Certain aspects provide an apparatus for wireless communication. The apparatus generally includes a processing system configured to determine a PDCP duplication configuration corresponding to at least one of MC or CA for communication of at least one bearer with a UE, wherein the determination is based on an indication corresponding to a link quality for the communication, and send an indication of the determined configuration for the communication of the at least one bearer, and a memory coupled to the processing system.

Certain aspects provide a computer-readable medium having instructions stored thereon to cause a processor to determine a PDCP duplication configuration corresponding to at least one of MC or CA for communication of at least one bearer with a UE, wherein the determination is based on an indication corresponding to a link quality for the communication, and send an indication of the determined configuration for the communication of the at least one bearer.

Certain aspects provide an apparatus for wireless communication. The apparatus generally includes means for determining a PDCP duplication configuration corresponding to at least one of MC or CA for communication of at least one bearer with a UE, wherein the determination is based on an indication corresponding to a link quality for the communication, and means for sending an indication of the determined PDCP duplication configuration for the communication of the at least one bearer.

To the accomplishment of the foregoing and related ends, the one or more aspects comprise the features hereinafter fully described and particularly pointed out in the claims.

The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

FIG. 9 is a block diagram of a protocol stack illustrating a configuration for carrier aggregation (CA), in accordance with certain aspects of the present disclosure.

FIG. 10 illustrates an example communication architecture having a central unit (CU) and one or more distributed units (DUs), according to certain aspects of the present disclosure.

FIG. 11 is a flow diagram illustrating example operations for wireless communication, in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
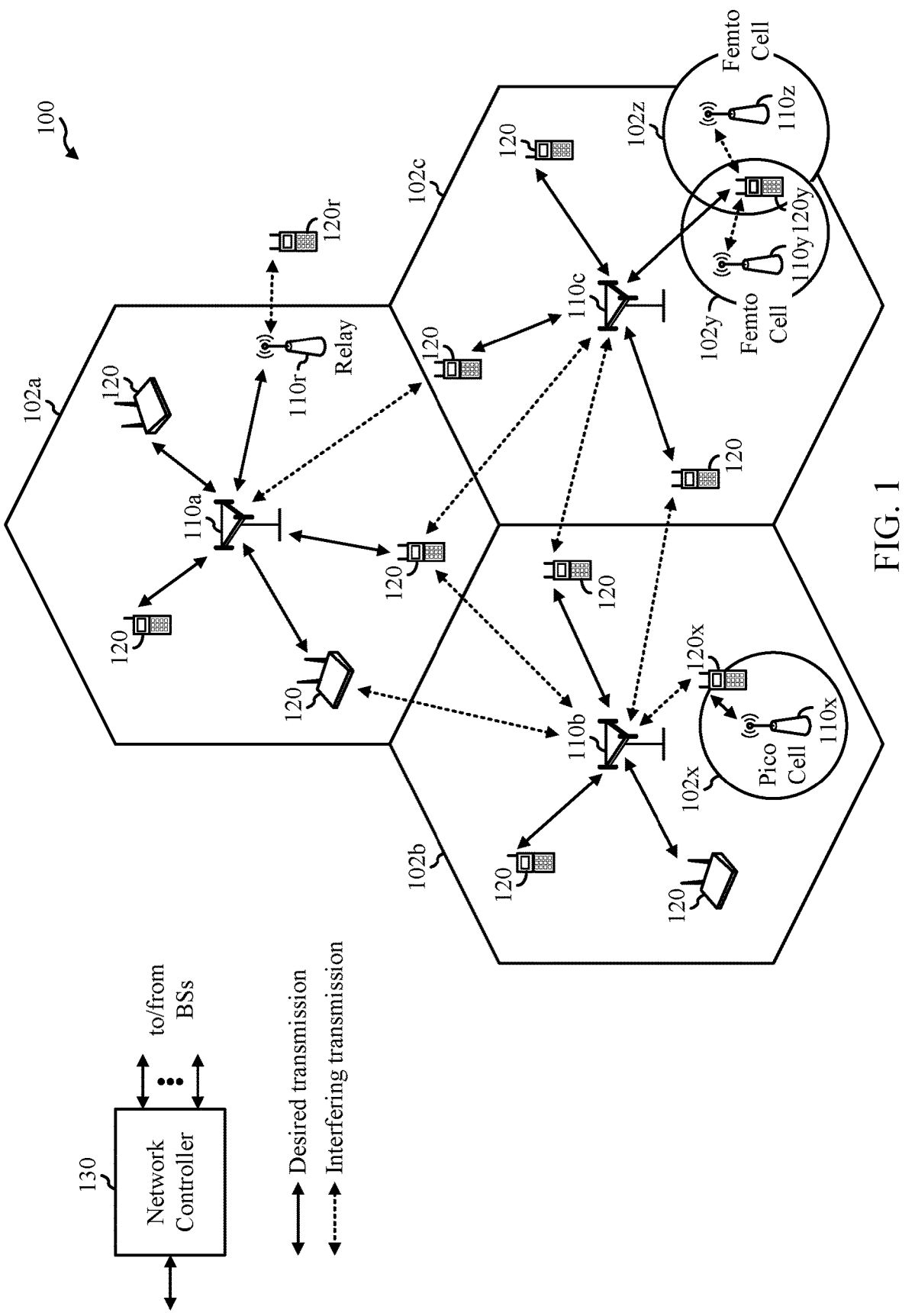
FIG. 1 is a block diagram conceptually illustrating an example telecommunications system, in accordance with certain aspects of the present disclosure.

Aspects of the present disclosure provide apparatus, methods, processing systems, and computer readable media ums for NR (new radio access technology or 5G technology). NR may support various wireless communication services, such as enhanced mobile broadband (eMBB) targeting wide bandwidth (e.g. 80 MHz beyond), millimeter wave (mmW) targeting high carrier frequency (e.g. 27 GHz or beyond), massive machine type communications (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

In certain systems, (e.g., 3GPP Release-13 long term evolution (LTE) networks), enhanced machine type communications (eMTC) are supported, targeting low cost devices, often at the cost of lower throughput. eMTC may involve half-duplex (HD) operation in which uplink transmissions and downlink transmissions can both be performed—but not simultaneously. Some eMTC devices (e.g., eMTC UEs) may look at (e.g., be configured with or monitor) no more than around 1 MHz or six resource blocks (RBs) of bandwidth at any given time. eMTC UEs may be configured to receive no more than around 1000 bits per subframe. For example, these eMTC UEs may support a max throughput of around 300 Kbits per second. This throughput may be sufficient for certain eMTC use cases, such as certain activity tracking, smart meter tracking, and/or updates, etc., which may consist of infrequent transmissions of small amounts of data; however, greater throughput for eMTC devices may be desirable for other cases, such as certain Internet-of-Things (IoT) use cases, wearables such as smart watches, etc.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication networks such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). NR is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

Example Wireless Communications System

FIG. 1 illustrates an example wireless network 100 in which aspects of the present disclosure may be performed. For example, the wireless network 100 may be a new radio (NR) or 5G network. A UE 120 may be configured for enhanced machine type communications (eMTC). The UE 120 may be considered a low cost device, low cost UE, eMTC device, and/or eMTC UE. The UE 120 can be configured to support higher bandwidth and/or data rates (e.g., higher than 1 MHz). The UE 120 may be configured with a plurality of narrowband regions (e.g., 24 resource blocks (RBs) or 96 RBs). The UE 120 may receive a resource allocation, from a BS 110, allocating frequency hopped resources within a system bandwidth for the UE 120 to monitor and/or transmit on. The resource allocation can indicate non-contiguous narrowband frequency resources for uplink transmission in at least one subframe. The resource allocation may indicate frequency resources are not contained within a bandwidth capability of the UE to monitor for downlink transmission. The UE 120 may determine, based on the resource allocation, different narrowband than the resources indicated in the resource allocation from the BS 110 for uplink transmission or for monitoring. The resource allocation indication (e.g., such as that included in the downlink control information (DCI)) may include a set of allocated subframes, frequency hopping related parameters, and an explicit resource allocation on the first subframe of the allocated subframes. The frequency hopped resource allocation on subsequent subframes are obtained by applying the frequency hopping procedure based on the frequency hopping related parameters (which may also be partly included in the DCI and configured partly through radio resource control (RRC) signaling) starting from the resources allocated on the first subframe of the allocated subframes.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a NB subsystem serving this coverage area, depending on the context in which the term is used. In NR systems, the term "cell" and NB, next generation NB (gNB), 5G NB, access point (AP), BS, NR BS, or transmission reception point (TRP) may be interchangeable. In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, a tone, a subband, a subcarrier, etc. Each frequency may support a single RAT in a given geographic area in order to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, a macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, for example, directly or indirectly via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices or narrowband IoT (NB-IoT) devices.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (e.g., an RB) may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.8 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a sub-carrier bandwidth of 75 kHz over a 0.1 ms duration. Each radio frame may consist of two half frames, each half frame consisting of 5 subframes, with a length of 10 ms. Consequently, each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 7. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In LTE, the basic transmission time interval (TTI) or packet duration is the 1 subframe. In NR, a subframe is still 1 ms, but the basic TTI is referred to as a slot. A subframe contains a variable number of slots (e.g., 1, 2, 4, 8, 16, . . . slots) depending on the tone-spacing (e.g., 15, 30, 60, 120, 240 . . . kHz).

In some examples, access to the air interface may be scheduled, wherein a scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

Figure 2:
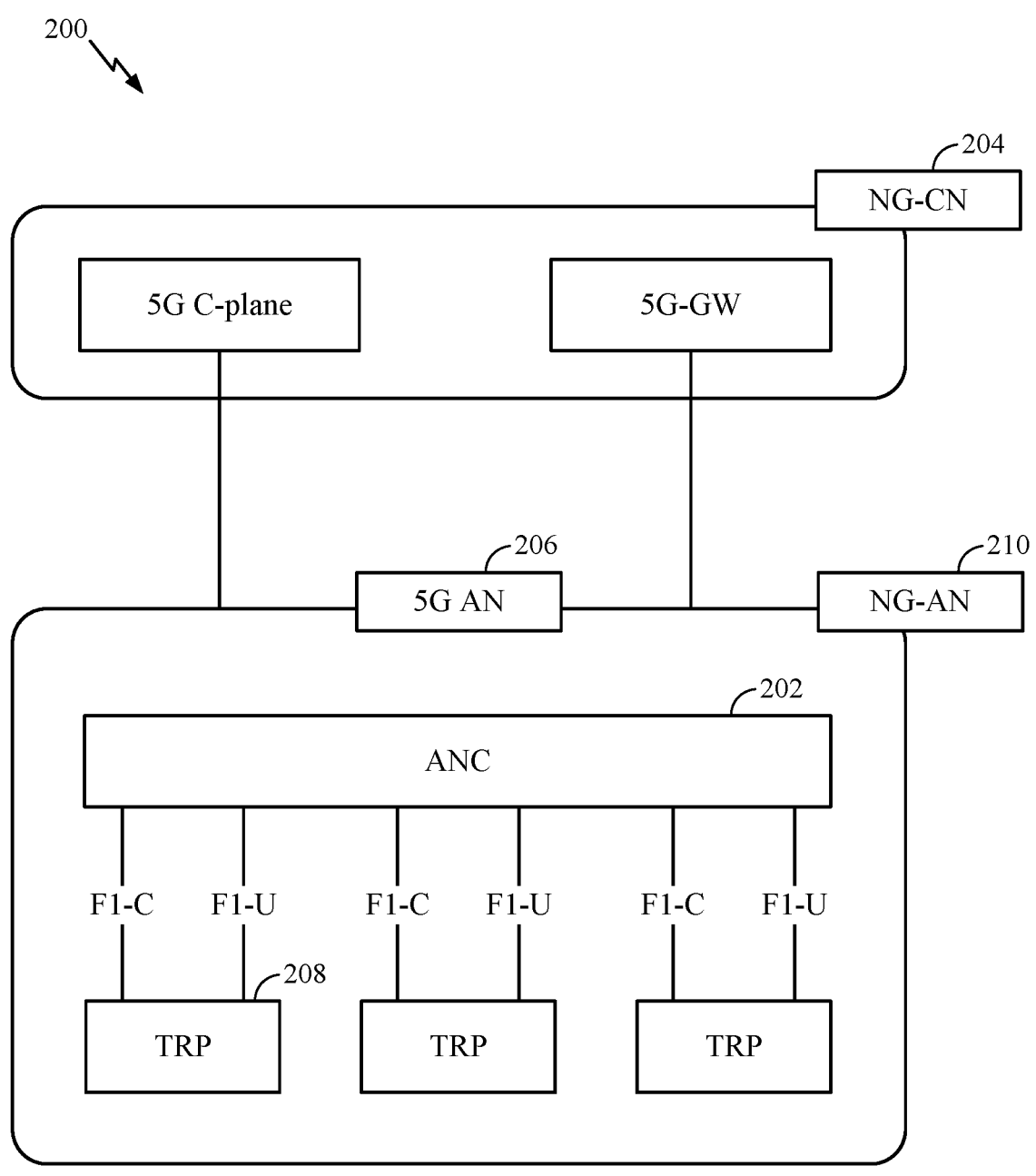
FIG. 2 is a block diagram illustrating an example logical architecture of a distributed radio access network (RAN), in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC 202 may be a central unit (CU) of the distributed RAN 200. The backhaul interface to the next generation core network (NG-CN) 204 may terminate at the ANC 202. The backhaul interface to neighboring next generation access nodes (NG-ANs) 210 may terminate at the ANC 202. The ANC 202 may include one or more TRPs 208 (which may also be referred to as BSs, NR BSs, gNBs, or some other term).

The TRPs 208 may be a DU. The TRPs may be connected to one ANC (ANC 202) or more than one ANC (not illustrated). For example, for RAN sharing, radio as a service (RaaS), and service specific AND deployments, the TRP 208 may be connected to more than one ANC. A TRP may include one or more antenna ports. The TRPs may be configured to individually (e.g., dynamic selection) or jointly (e.g., joint transmission) serve traffic to a UE.

The logical architecture of the distributed RAN 200 may support fronthauling solutions across different deployment types. For example, the logical architecture may be based on transmit network capabilities (e.g., bandwidth, latency, and/or jitter). The logical architecture may share features and/or components with LTE. The NG-AN 210 may support dual connectivity with NR. The NG-AN 210 may share a common fronthaul for LTE and NR. The logical architecture may enable cooperation between and among TRPs 208. For example, cooperation may be preset within a TRP and/or across TRPs via the ANC 202. An inter-TRP interface may be present.

The logical architecture of the distributed RAN 200 may support a dynamic configuration of split logical functions. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively).

Figure 3:
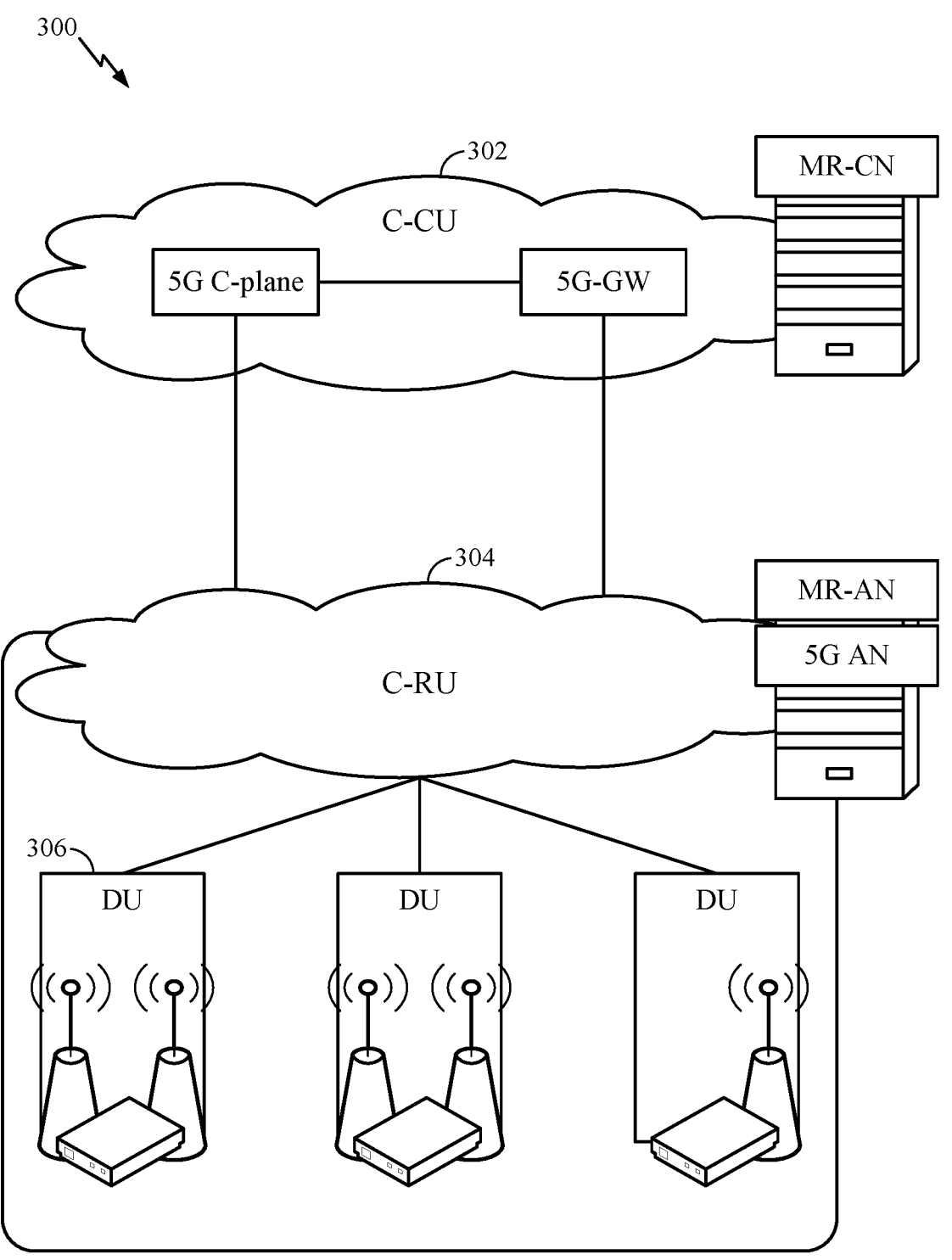
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU 302 may be centrally deployed. C-CU functionality may be offloaded (e.g., to advanced wireless services (AWS)), in an effort to handle peak capacity.

A centralized RAN unit (C-RU) 304 may host one or more ANC functions. The C-RU 304 may host core network functions locally. The C-RU 304 may have distributed deployment. The C-RU 304 may be closer to the network edge.

A DU 306 may host one or more TRPs (e.g., an edge node (EN), an edge unit (EU), a radio head (RH), a smart radio head (SRH), or the like). The DU may be located at edges of the network with radio frequency (RF) functionality.

Figure 4:
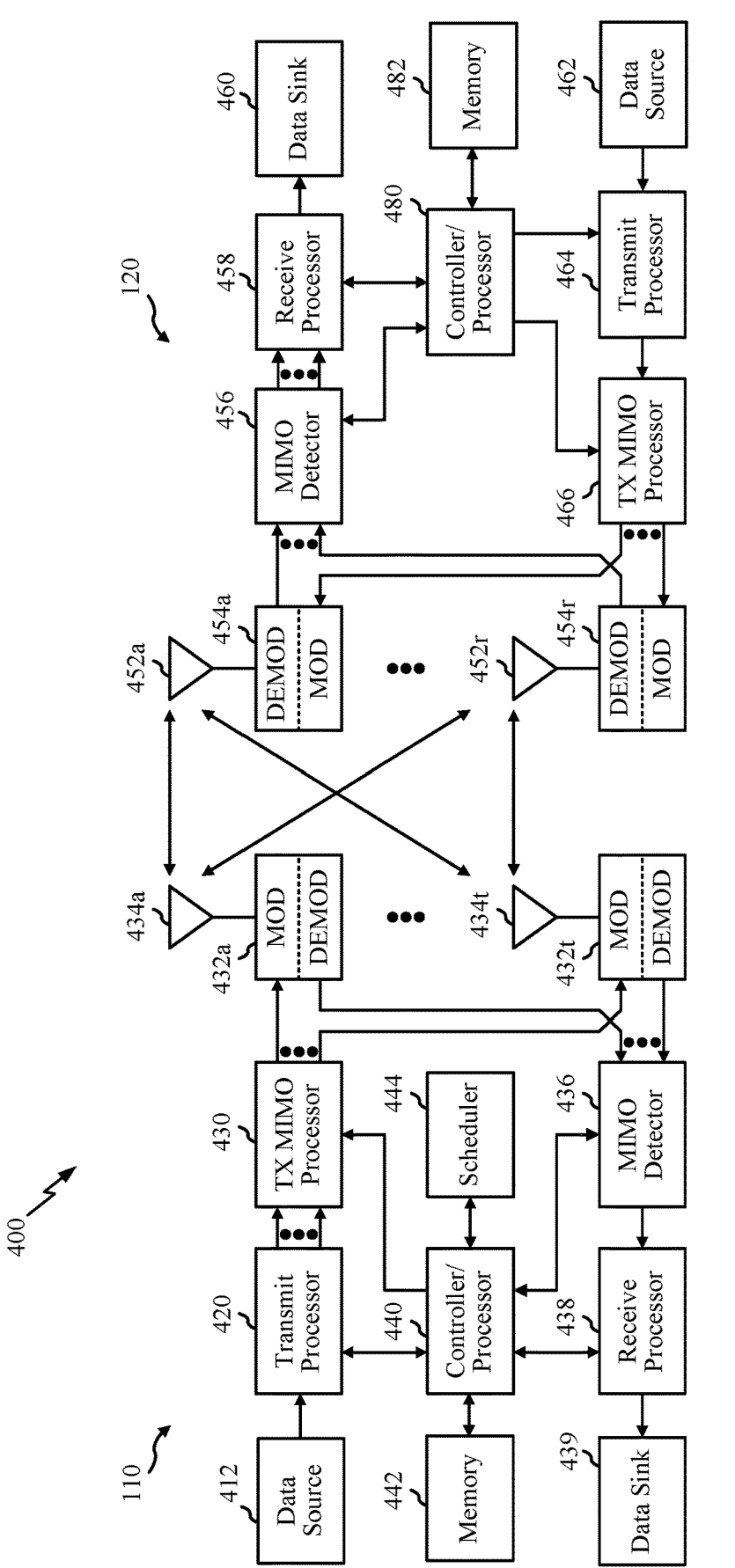
FIG. 4 is a block diagram conceptually illustrating a design of an example base station (BS) and user equipment (UE), in accordance with certain aspects of the present disclosure.

FIG. 4 illustrates example components of the BS 110 and UE 120 illustrated in FIG. 1, which may be used to implement aspects of the present disclosure for frequency hopping for large bandwidth allocations. For example, antennas 452, Tx/Rx 222, processors 466, 458, 464, and/or controller/processor 480 of the UE 120 and/or antennas 434, processors 460, 420, 438, and/or controller/processor 440 of the BS 110 may be used to perform the operations described herein and illustrated with reference to FIGS. 9-11.

FIG. 4 shows a block diagram of a design of a BS 110 and a UE 120, which may be one of the BSs and one of the UEs in FIG. 1. For a restricted association scenario, the BS 110 may be the macro BS 110*c* in FIG. 1, and the UE 120 may be the UE 120*y*. The BS 110 may also be BS of some other type. The BS 110 may be equipped with antennas 434*a* through 434*t*, and the UE 120 may be equipped with antennas 452*a* through 452*r*.

At the BS 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432*a* through 432*t*. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432*a* through 432*t* may be transmitted via the antennas 434*a* through 434*t*, respectively.

At the UE 120, the antennas 452*a* through 452*r* may receive the downlink signals from the BS 110 and may provide received signals to the demodulators (DEMODs) 454*a* through 454*r*, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454*a* through 454*r*, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454*a* through 454*r* (e.g., for SC-FDM, etc.), and transmitted to the BS 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct, e.g., the execution of various processes for the techniques described herein. The processor 480 and/or other processors and modules at the UE 120 may also perform or direct, e.g., the execution of the functional blocks illustrated in FIGS. 9 and 11, and/or other processes for the techniques described herein. The processor 440 and/or other processors and modules at the BS 110 may also perform or direct, e.g., the execution of the functional blocks illustrated in FIG. 11, and/or other processes for the techniques described herein. The memories 442 and 482 may store data and program codes for the BS 110 and the UE 120, respectively. A scheduler 444 may schedule UEs for data transmission on the downlink and/or uplink.

Figure 5:
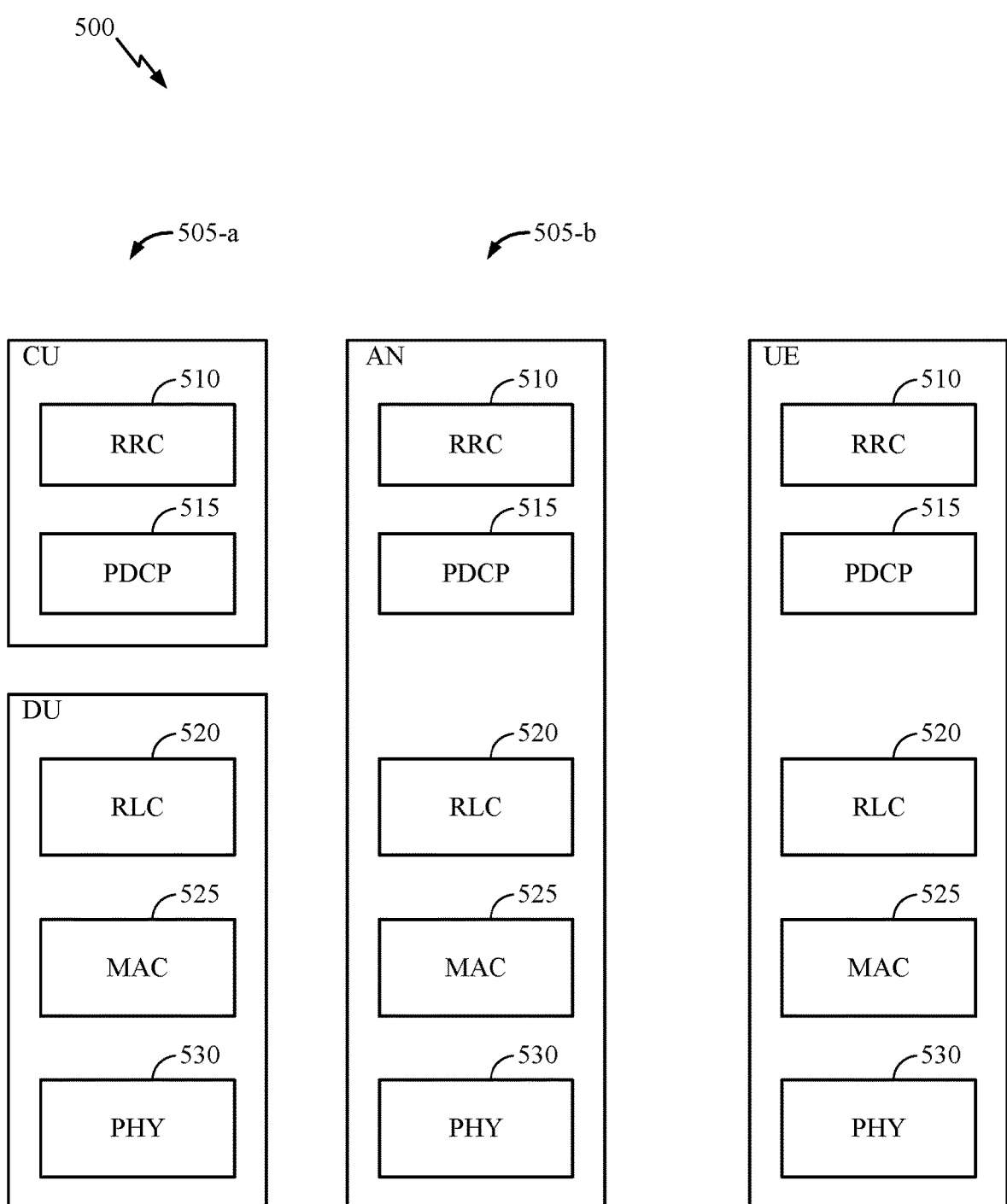
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-*a* shows a split implementation of a protocol stack, in which implementation of the protocol stack is split between a centralized network access device (e.g., an ANC 202 in FIG. 2) and distributed network access device (e.g., DU 208 in FIG. 2). In the first option 505-*a*, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-*a* may be useful in a macro cell, micro cell, or pico cell deployment.

A second option 505-*b* shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-*b* may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6:
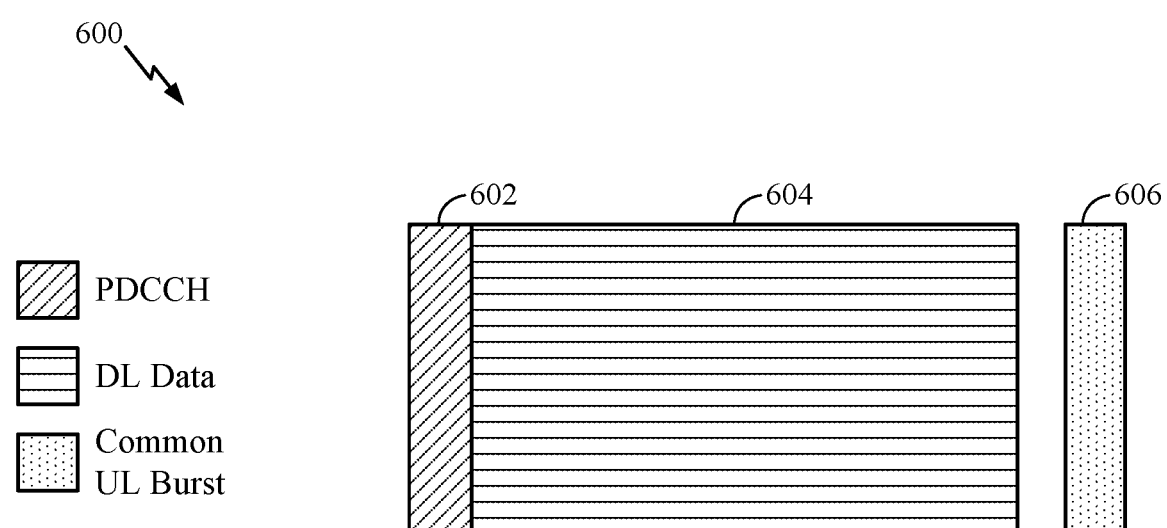
FIG. 6 illustrates an example of a downlink-centric subframe, in accordance with certain aspects of the present disclosure.

FIG. 6 is a diagram showing an example format of a DL-centric subframe 600. The DL-centric subframe 600 may include a control portion 602. The control portion 602 may exist in the initial or beginning portion of the DL-centric subframe 600. The control portion 602 may include various scheduling information and/or control information corresponding to various portions of the DL-centric subframe 600. In some configurations, the control portion 602 may be a physical DL control channel (PDCCH), as indicated in FIG. 6. The DL-centric subframe 600 may also include a DL data portion 604. The DL data portion 604 may sometimes be referred to as the payload of the DL-centric subframe 600. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe 600 may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 7:
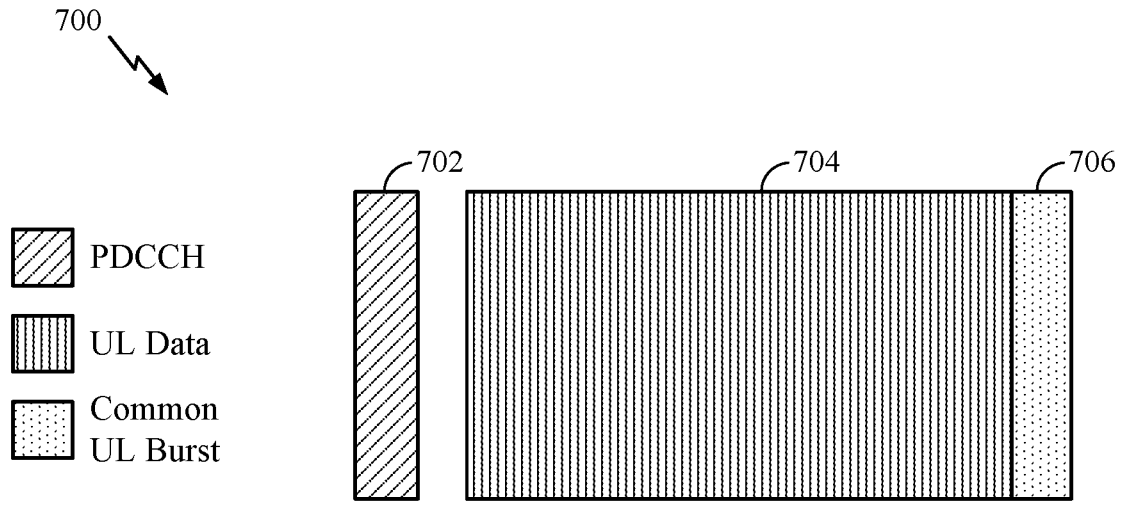
FIG. 7 illustrates an example of an uplink-centric subframe, in accordance with certain aspects of the present disclosure.

FIG. 7 is a diagram showing an example format of an UL-centric subframe 700. The UL-centric subframe 700 may include a control portion 702. The control portion 702 may exist in the initial or beginning portion of the UL-centric subframe 700. The control portion 702 in FIG. 7 may be similar to the control portion 602 described above with reference to FIG. 6. The UL-centric subframe 700 may also include an UL data portion 704. The UL data portion 704 may sometimes be referred to as the payload of the UL-centric subframe 700. The UL portion may refer to the communication resources utilized to communicate UL data from the subordinate entity (e.g., UE) to the scheduling entity (e.g., UE or BS). In some configurations, the control portion 702 may be a PDCCH.

As illustrated in FIG. 7, the end of the control portion 702 may be separated in time from the beginning of the UL data portion 704. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe 700 may also include a common UL portion 706. The common UL portion 706 in FIG. 7 may be similar to the common UL portion 706 described above with reference to FIG. 7. The common UL portion 706 may additional or alternative include information pertaining to channel quality indicator (CQI), sounding reference signals (SRSs), and various other suitable types of information. One of ordinary skill in the art will understand that the foregoing is merely one example of an UL-centric subframe 700 and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet-of-Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Techniques for Determining Configuration for Packet Data Convergence Protocol (PDCP) Duplication Packet data convergence protocol (PDCP) duplication involves sending the same PDCP packet data unit (PDU) twice (or more), once on an original radio link control (RLC) entity and a second time on an additional RLC entity. For example, PDCP duplication may include multi-connectivity (MC) or carrier-aggregation (CA) type communication. Dual connectivity (DC), multi-RAT DC and NR-only DC are a few examples of MC. MC generally refers to a mode of operation wherein a UE is connected to a master node (which may be a gNB or an eNB) and at least one secondary node (which may be a gNB, ng-eNB or an eNB). For instance, NR-only DC generally refers to a mode of operation wherein a UE is connected (e.g., radio resource control (RRC) connected) to a master gNB (MgNB) and one secondary gNB (SgNB). The aspects discussed herein apply to all forms of MC, even though some examples focus on NR-only DC to facilitate understanding.

Figure 8:
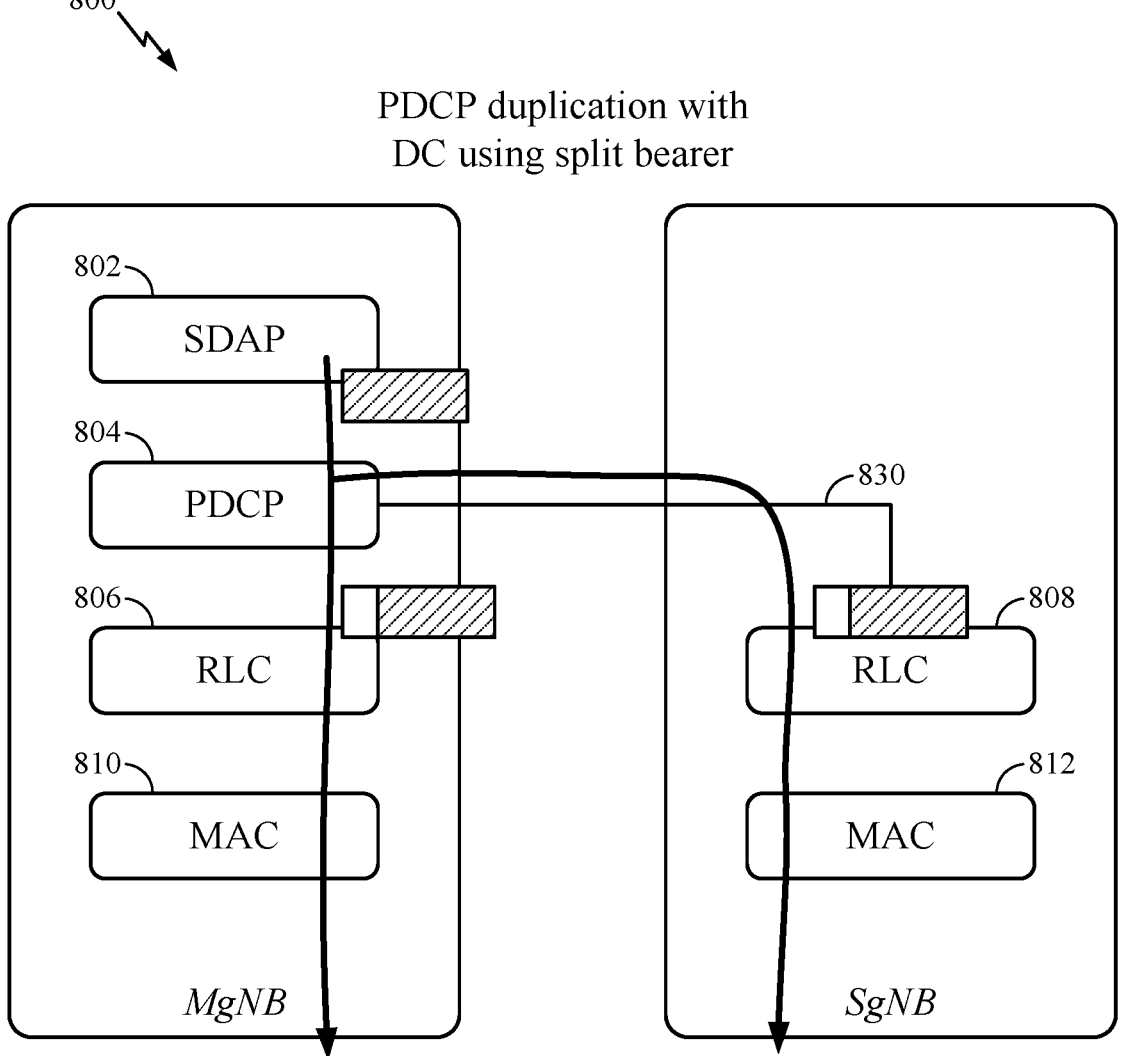
FIG. 8 is a block diagram of a protocol stack illustrating a configuration for multi-connectivity (MC), in accordance with certain aspects of the present disclosure.

FIG. 8 is a block diagram of a protocol stack 800 illustrating a configuration for MC, in accordance with certain aspects of the present disclosure. FIG. 8 shows a specific example of MC, with two different gNB s, that may be referred to as dual connectivity (DC). As illustrated, a service data adaption protocol (SDAP) packet is provided from the SDAP layer 802 to the PDCP layer 804 at the MgNB. PDCP layer 804 processes the SDAP packet (e.g., adds a header) to form a packet. The packet is duplicated at the PDCP layer and provided to the SgNB (e.g., via an X2 interface 830). The packet and the packet duplicate are then processes by respective RLC layers 806 and 808 and respective MAC layers 810 and 812 for transmission.

FIG. 9 is a block diagram of a protocol stack 900 illustrating a configuration for CA, in accordance with certain aspects of the present disclosure. The protocol stack 900 is implemented in a gNB with two component carriers (CCs) CC1 and CC2. As illustrated, an SDAP packet is provided from the SDAP layer 902 to the PDCP layer 904 of the gNB. PDCP layer 904 processes the SDAP packet to form a packet. The packet is then duplicated at the PDCP layer 904. The packet and the packet duplicate are then processed, by respective RLC layers 906 and 908 of the gNB, and a scheduler 910 at the MAC layer where the information in the packet and the packet duplicate are scheduled for transmission via CC1 and CC2 using a hybrid automatic repeat request (HARM) protocol.

As used herein, the term PDCP duplication generally refers to duplicating a packet at the PDCP layer, as described. The PDCP duplication may be implemented using one of multiple configurations, which may be decided by the gNB or indicated to the gNB by another entity. For example, the gNB may decide to configure duplication of a radio bearer (e.g., data radio bearer, signal radio bearer), or deactivate or activate PDCP duplication for a radio bearer as part of the configuration decision. Other examples of determining a PDCP duplication configuration may include determining which SgNB (e.g., where the MgNB is associated with multiple SgNBs) to use for the bearer split at the PDCP layer, or a time at which the bearer is to be split.

FIG. 10 illustrates an example communication architecture 1000 having a central unit (CU) (e.g., master gNB or a secondary gNB associated with a UE) and one or more distributed units (DUs) (e.g., primary cell (PCell) or secondary cell (SCell) associated with a UE), according to certain aspects of the present disclosure. As described with respect to FIG. 3, a CU may be associated with multiple DUs. For example, each of the gNBs 1002 and 1004 may be connected, via a respective next-gen (NG) interface, to a 5G core (5GC) network, as illustrated. The gNBs 1002, 1004 may communicate using one of multiple interfaces, such as an Xn interface. The gNBs 1002 may each include a CU 1005, 1006, and multiple DUs. For example, the CU 1005 may be associated with DUs 1007, 1009, and the CU 1006 may be associated with the DUs 1008, 1010. The CUs 1005, 1006 may communicate with respective DUs via respective F1 interfaces, as illustrated.

Certain aspects of the present disclosure are generally directed to apparatus and techniques for determining a PDCP duplication configuration for communicating a bearer with a UE. Multiple CUs and DUs may be involved in PDCP duplication. For example, two CUs may be involved in PDCP duplication with DC, and more than one DU (and one CU) may be involved in PDCP duplication with CA.

FIG. 11 is a flow diagram illustrating example operations 1100 for wireless communication, in accordance with certain aspects of the present disclosure. The operations 1100 may be performed by a network entity, such as a central unit (CU) (e.g., CU 1006 of FIG. 10) or a DU (e.g., DU 1008 or 1010).

The operations 1100 may begin, at block 1102, by determining a PDCP duplication configuration corresponding to at least one of MC or CA for communication of a bearer with a UE. In certain aspects, the determination may be based on an indication corresponding to a link quality for the communication. For example, the indication corresponding to the link quality may be a request from another network entity (e.g., another CU or another DU) or the UE for a particular configuration to be used.

At block 1104, an indication of the determined configuration for the communication of the bearer may be sent. For example, an indication of the determined PDCP duplication configuration may be sent to a UE via an RRC message (e.g., when configuring a data radio bearer of the UE for PDCP duplication), or a MAC message (e.g., using a MAC control element, to activate or deactivate PDCP duplication or to configure a signaling radio bearer of the UE for PDCP duplication). In certain aspects, an indication of the determined PDCP duplication configuration may be sent to other CUs and DUs using messages over, for example, X2, Xn, or F1 interfaces. The network entity may then use the determined configuration to communicate one or more packet with the UE.

As presented above, the network entity performing the determination of the PDCP duplication may be a CU (e.g., CU 1006) or a DU (e.g., DU 1008). For example, for a DL PDCP configuration (e.g., a PDCP configuration for DL communication), the network entity performing the determination of the PDCP duplication configuration with DC may be a CU (e.g., CU 1006). In this case, each involved DU (or SgNB) may provide assistance information either as a suggestion to activate a specific DL PDCP duplication configuration, or in the form of link quality measurement reports. In certain aspects, the CU may trigger the reporting of the link quality from the DU. In some cases, the CU may determine the DL PDCP duplication configuration based on quality reports received (e.g., directly or via a DU) from the UE. In certain aspects, for an UL PDCP configuration (e.g., a PDCP configuration for UL communication), the network entity performing the determination of the PDCP duplication configuration may be a DU (e.g., DU 1008). In this case, an initial state of the PDCP duplication configuration may be set by the CU.

Similarly, for a DL PDCP configuration, the network entity performing the determination of the PDCP duplication configuration with CA may be a CU (e.g., CU 1006). In this case, each involved DU (or SgNB) may provide assistance information either as a suggestion to activate a specific DL PDCP duplication configuration, or in the form of link quality measurement reports on a per-bearer path and/or RLC channel basis. For an UL PDCP configuration, the network entity performing the determination of the UL PDCP duplication configuration may be a DU, while the initial state may be still be set by the CU.

In certain aspects, the PDCP duplication configuration may be made based on one or more link quality measurements indicating a signal quality for communication of the bearer with the UE. For example, when the PDCP duplication configuration determination is made at the CU 1006, the CU 1006 may use one or more link quality measurements stored at the CU 1006 for the determination. When the link quality measurement indicates a poor link quality, the CU 1006 may determine to activate the PDCP duplication, and may later determine to deactivate PDCP duplication when the link quality has improved.

In certain aspects, the link quality measurements may be provided to the CU 1006 for the configuration determination by another CU (e.g., CU 1005). For example, the CU 1005 may provide the link quality measurements to the CU 1006 (e.g., via an RRC transfer, a message over an X2 interface, or a message over an Xn interface), and the CU 1006 may use the received link quality measurements to determine the PDCP duplication configuration. In certain aspects, the link quality measurements sent by the CU 1005 may include measurements collected by one or more of the DUs 1007 and 1009 that are associated with the CU 1005.

In certain aspects, the link quality measurements may be collected by the DUs 1008 and 1010, and provided to the CU 1006 (e.g., via an F1 interface) for determining the PDCP duplication configuration. The measurements may be provided by the UE via one or more measurement reports. In some cases, the measurements are collected by the DUs 1008 and 1010 and may include layer one measurements (e.g., channel quality indicator (CQI) from the UE) or may be based on a received UE signal strength measurement (or any other suitable uplink (UL) based measurements).

In certain aspects, when the PDCP duplication configuration is determined by a DU (e.g., DU 1008), the measurement may be received from another DU (e.g., DU 1007) that is associated with a different CU. For example, the DU 1008 may determine the PDCP duplication configuration based on a link quality measurement received from DU 1007 using an RRC transfer or using an X2 message between corresponding CUs (e.g., CUs 1005 and 1006). In certain aspects, when the PDCP duplication configuration is determined by a DU (e.g., DU 1008), link quality measurements may be collected by the DU and the measurements may include layer one measurements (e.g., channel quality indicator (CQI) from the UE) or may be based on a received UE signal strength measurement (or any other suitable uplink (UL) based measurements).

In certain aspects, the determination of the configuration for PDCP duplication may be based on a received request for the configuration. For example, the network entity determining the configuration may receive an explicit request for a specific configuration to be used. In some cases, the message requesting the configuration may optionally include link quality measurements. The network entity determining the PDCP duplication configuration may receive the request from a CU, a DU, or the UE with which the bearer is be communicated. For example, when the CU 1006 is determining the configuration, the CU 1006 may receive a request for a specific configuration to be used from either the CU 1005, DU 1008, or a UE.

In certain aspects, the network entity may determine the configuration based on a current state of the duplication configuration for the bearer. For example, the determination may be based on one or more factors including whether MC or CA is configured for the UE, whether MC or CA is allowed for the UE, whether PDCP duplication is configured for the bearer, whether PDCP duplication is activated (or deactivated) for the bearer, whether the bearer is a master cell group (MCG) bearer, whether the CU is associated with the MCG of the bearer, whether the bearer is a secondary cell group (SCG) bearer, whether the CU is associated with the SCG of the bearer, or whether the bearer is a split bearer. When a DU is determining the configuration, the configuration may further be determined by taking into account whether the RLC entities for implementing a particular configuration are associated with the same DU.

In certain aspects, the network entity may determine the configuration based on historical data. For example, the historical data may include historical measurements obtained by the network entity (e.g., from other CUs and/or DUs), and/or historical record of success of different configurations for PDCP duplication.

In certain aspects, the historical data may be used in conjunction with a mobility pattern of the UE. For example, the network entity may consider historical measurements from DUs and CUs to determine if a given configured PDCP duplication is likely to be successful (e.g., resulted in successful delivery of a packet), and select a configuration which is most likely to be successful by factoring in the mobility patterns of the UE. For instance, the mobility pattern may indicate that the UE may be under the coverage of a certain set of gNBs during a certain phases of UE mobility and under the coverage of another set during another phase. Thus, a configuration may be selected to perform MC using the set of gNB(s) that has coverage for the UE for a current phase of mobility pattern of the UE. The network entity may refrain from activating a configuration involving PDCP duplication via gNBs during a particular phase of UE mobility, if the related measurements and historical PDCP duplication success indicators suggest that the configuration for PDCP duplication via the gNB s is unlikely to improve communication reliability during the current mobility phase of the UE, and may instead select a different configuration.

In certain aspects, the network entity may determine a maximum signal quality for communication between the UE and each of a first set of gNBs and a second set of gNBs for each of various time instants of a phase of mobility pattern of the UE. The network entity may then compute a reliability metric for the first set of gNBs. The reliability metric for the first set of gNBs may correspond to a minimum of the maximum computed signal quality for the various time instants for communication with the first set of gNBs. Similarly, the network entity may compute a reliability metric for the second set of gNBs as the minimum of the maximum computed signal quality for the various time instants for communication with the second set of gNBs. The network entity may then select the set of gNBs (e.g., for MC communication with the UE) having the highest of the computed metrics for the PDCP duplication configuration.

The techniques described herein for using historical data, optionally along with UE mobility pattern, may also be applied to sets of cells, where each cell corresponds to a coverage area for a particular CC. For example, historical data may suggest a high likelihood of successful packet communication with a UE during a phase of UE mobility. Thus, the cells having a high likelihood of successful packet communication for the phase of UE mobility may be selected for CA.

In certain aspects, PDCP duplication success during a UE mobility phase may be measured by the network entity based on how often copies of a duplicated packet are received by the receiver (e.g., received by the UE during DL or received by the MgNB CU during UL), or how often at least one copy of the duplicated packet is received by the receiver. For example, if based on historical data, the network entity determines that MC using a particular set of gNBs resulted in a certain number of successful packet receptions (e.g., as a percentage of a total number of packet transmissions), the network entity may select the configuration for MC using the set of gNBs. In certain aspects, the network entity determining the configuration may receive an indication of one or more configurations that have been determined to not be used. For example, DU 1008 may determine that a certain configuration should not be used (e.g., due to a temporary unavailability of support for the configuration), and indicate the configuration to the CU 1006 such that the CU 1006 does not select the indicated configuration.

As presented above, the operations described herein for determining a configuration for PDCP duplication may be performed by a CU or DU. For example, the CU may determine the configuration and may include a MgNB or a SgNB, or a DU may determine the configuration and may include one or more of a PCell and SCells.

Figure 12:
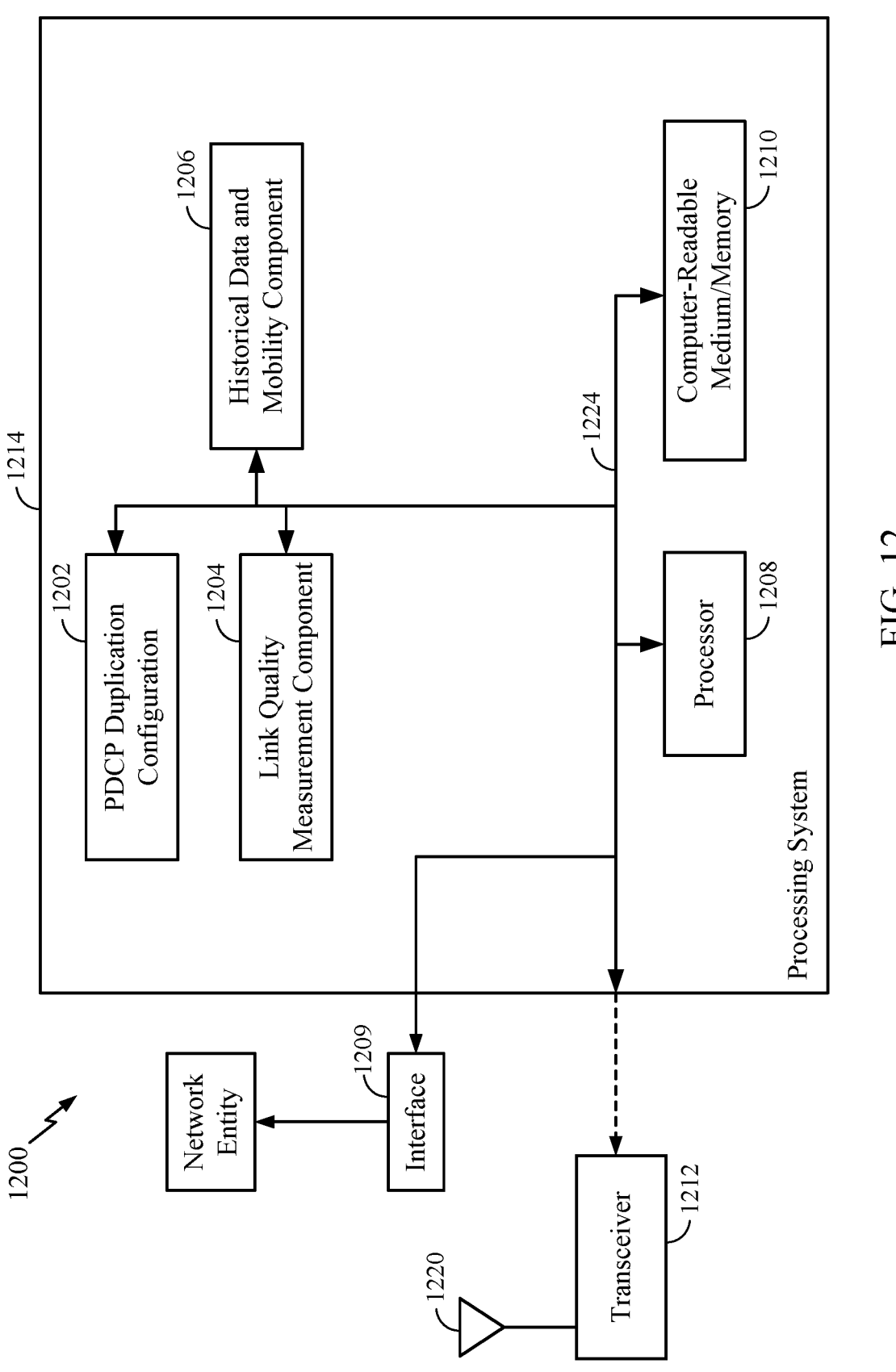
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 11. The communications device 1200 includes a processing system 1214 which may be coupled to a communication interface 1209 (e.g., F1 interface) for communicating with a network entity, as illustrated. In certain aspects, the processing system 1214 may be coupled to a transceiver 1212 for wireless communication data to one or more UEs. The transceiver 1212 is configured to transmit and receive signals for the communications device 1200 via an antenna 1220, such as the various signal described herein. The processing system 1214 may be configured to perform processing functions for the communications device 1200, including processing signals received and/or to be transmitted by the communications device 1200.

The processing system 1214 includes a processor 1208 coupled to a computer-readable medium/memory 1210 via a bus 1224. In certain aspects, the computer-readable medium/memory 1210 is configured to store instructions that when executed by processor 1208, cause the processor 1208 to perform the operations illustrated in FIG. 11, or other operations for performing the various techniques discussed herein.

In certain aspects, the processing system 124 further includes a PDCP duplication configuration component 1202 for determining a PDCP duplication configuration as described herein. Additionally, the processing system 1214 may include a link quality measurement component 1204 for performing the link quality measurements which may be taken into account by the PDCP duplication configuration component 1202 when determining the PDCP duplication configuration. The processing system 1214 may include a historical data and mobility component 1206 for determining historical data and/or UE mobility pattern, as described herein. The PDCP duplication configuration component 1202, link quality measurement component 1204, and historical data and mobility component 1206 may be coupled to the processor 1208 via bus 1224. In certain aspects, PDCP duplication configuration component 1202, link quality measurement component 1204, and historical data and mobility component 1206 may be hardware circuits. In certain aspects, the PDCP duplication configuration component 1202, link quality measurement component 1204, and historical data and mobility component 1206 may be software components that are executed and run on processor 1208.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a central unit (CU), comprising:

receiving, at the CU from another CU, a request to activate a downlink (DL) packet data convergence protocol (PDCP) duplication configuration;

receiving one or more link quality measurements from the another CU, via a measurement report received from the another CU via a radio resource control (RRC) transfer, via an X2 interface message, or via an Xn interface message, wherein the one or more link quality measurements include at least one of channel quality indicator (CQI) or signal strength measurements;

determining the DL PDCP duplication configuration corresponding to multi-connectivity (MC) for communication of at least one bearer with a UE, wherein the determination is based on the request from the another CU and the one or more link quality measurements; and sending an indication of the determined DL PDCP duplication configuration for the communication of the at least one bearer.

2. The method of claim 1, further comprising:

receiving one or more of a plurality of measurement reports sent to the CU by the UE; or receiving a request, from the UE, for the DL PDCP duplication configuration for the at least one bearer.

3. The method of claim 1, wherein the determination is further based on at least one of whether:

MC is configured for the UE;

MC is allowed for the UE;

PDCP duplication is configured for the at least one bearer;

PDCP duplication is activated for the at least one bearer;

PDCP duplication is deactivated for the at least one bearer;

the at least one bearer is a master cell group (MCG) bearer;

the CU is associated with the MCG of the at least one bearer;

the at least one bearer is a secondary cell group (SCG) bearer;

the CU is associated with the SCG of the at least one bearer; or the at least one bearer comprises a split bearer.

4. The method of claim 1, wherein the DL PDCP duplication configuration is further determined based on historical data, wherein the historical data comprises at least one of:

historical link quality measurements; or historical records indicating success of different PDCP duplication configurations, the different PDCP duplication configurations comprising the determined DL PDCP duplication configuration.

5. The method of claim 4, wherein the determination is further based on a mobility pattern of the UE.

6. The method of claim 4, wherein the determination comprises determining a current mobility phase of the UE, and determining success of the determined DL PDCP duplication configuration for the current mobility phase based on the historical data.

7. The method of claim 1, wherein the request to activate the DL PDCP duplication configuration is received via an Xn interface between the CU and the another CU.

8. The method of claim 1, wherein the indication of the determined DL PDCP duplication configuration is sent to a distributed unit (DU).

9. An apparatus for wireless communication by a central unit (CU), comprising:

a processing system configured to:

receive, at the CU from another CU, a request to activate a downlink (DL) packet data convergence protocol (PDCP) duplication configuration;

receive one or more link quality measurements from the another CU, via a measurement report received from the another CU via a radio resource control (RRC) transfer, via an X2 interface message, or via an Xn interface message, wherein the one or more link quality measurements include at least one of channel quality indicator (CQI) or signal strength measurements;

determine the DL PDCP duplication configuration corresponding to multi-connectivity (MC) for communication of at least one bearer with a UE, wherein the determination is based on the request from the another CU and the one or more link quality measurements; and send an indication of the determined DL PDCP duplication configuration for the communication of the at least one bearer; and a memory coupled to the processing system.

10. The apparatus of claim 9, wherein the processing system is further configured to:

receive one or more of a plurality of measurement reports sent to the CU by the UE; or receive a request, from the UE, for the DL PDCP duplication configuration for the at least one bearer.

11. The apparatus of claim 9, wherein the processing system is configured to determine the DL PDCP duplication configuration based on at least one of whether:

MC is configured for the UE;

MC is allowed for the UE;

PDCP duplication is configured for the at least one bearer;

PDCP duplication is activated for the at least one bearer;

PDCP duplication is deactivated for the at least one bearer;

the at least one bearer is a master cell group (MCG) bearer;

the CU is associated with the MCG of the at least one bearer;

the at least one bearer is a secondary cell group (SCG) bearer;

the CU is associated with the SCG of the at least one bearer; or the at least one bearer comprises a split bearer.

12. The apparatus of claim 9, wherein the DL PDCP duplication configuration is further determined based on historical data, wherein the historical data comprises at least one of:

historical link quality measurements; or historical records indicating success of different PDCP duplication configurations, the different PDCP duplication configurations comprising the determined DL PDCP duplication configuration.

13. The apparatus of claim 12, wherein the determination is further based on a mobility pattern of the UE.

14. The apparatus of claim 12, wherein the determination comprises determining a current mobility phase of the UE, and determining success of the determined DL PDCP duplication configuration for the current mobility phase based on the historical data.

15. A non-transitory computer-readable medium having instructions stored thereon to cause a central unit (CU) to:

receive, at the CU from another CU, a request to activate a downlink (DL) packet data convergence protocol (PDCP) duplication configuration;

receive one or more link quality measurements from the another CU, via a measurement report received from the another CU via a radio resource control (RRC) transfer, via an X2 interface message, or via an Xn interface message, wherein the one or more link quality measurements include at least one of channel quality indicator (CQI) or signal strength measurements;

determine the DL PDCP duplication configuration corresponding to multi-connectivity (MC) for communication of at least one bearer with a UE, wherein the determination is based on the request from the another CU and the one or more link quality measurements; and send an indication of the determined DL PDCP duplication configuration for the communication of the at least one bearer.

16. An apparatus for wireless communication by a central unit (CU), comprising:

means for receiving, at the CU from another CU, a request to activate a downlink (DL) packet data convergence protocol (PDCP) duplication configuration;

means for receiving one or more link quality measurements from the another CU, via a measurement report received from the another CU via a radio resource control (RRC) transfer, via an X2 interface message, or via an Xn interface message, wherein the one or more link quality measurements include at least one of channel quality indicator (CQI) or signal strength measurements;

means for determining the DL PDCP duplication configuration corresponding to multi-connectivity (MC) for communication of at least one bearer with a UE, wherein the determination is based on the request from the another CU and the one or more link quality measurements; and means for sending an indication of the determined DL PDCP duplication configuration for the communication of the at least one bearer.

* * * * *